United States Patent [19]
Jones

[11] 3,912,332
[45] Oct. 14, 1975

[54] WHEEL

[75] Inventor: Vercoe C. Jones, Easton, Pa.

[73] Assignee: Si Handling Systems, Inc., Easton, Pa.

[22] Filed: June 28, 1974

[21] Appl. No.: 484,206

[52] U.S. Cl. ................................ 301/5.7; 308/188
[51] Int. Cl.² ........................................ B60B 27/00
[58] Field of Search............. 301/5 R, 5.3, 5.7, 109, 301/124 R, 125, 126, 131, 132; 308/188, 189 R, 190, 191, 193, 194, 195, 202, 207 R, 208, 210, 213, 216; 29/148.4 R, 148.4 A, 148.4 B, 148.4 C, 149.5 R, 149.5 DP

[56] References Cited
UNITED STATES PATENTS 1,748,971   3/1930   Buckwalter .................... 308/188
3,309,155   3/1967   Palmer ........................... 308/191

Primary Examiner—Lloyd L. King
Assistant Examiner—D. W. Keen
Attorney, Agent, or Firm—Seidel, Gonda & Goldhammer

[57] ABSTRACT

The wheel hub has a plurality of radially inwardly projecting ribs, the axial length of which is less than the axial thickness of the hub. Bearing sets are secured in said hub with said ribs being between the bearing sets and acting as a limit stop for the bearing sets.

7 Claims, 3 Drawing Figures

WHEEL

BACKGROUND

Heretofore, it has been conventional to provide a 360° shoulder on the I.D. of a wheel hub. The shoulder acts as a limit stop for bearing sets on opposite sides of the hub. The hub is usually a casting. In order to machine the casting, machinery is required to bore the I.D. and to turn the surfaces to receive the bearing outer race.

After one side of the hub is turned, the hub must be flipped over and then the other side turned. Thus, there is a material handling of the hub as well as the necessity for two different types of machinery, namely boring and turning machinery as well as the necessity for jigs and fixtures to be certain that the bores are concentric.

In accordance with the present invention, an annular wheel hub is cast or otherwise made so as to have a plurality of radially inwardly projecting ribs. The ribs are circumferentially disposed about the I.D. of the hub and have an axial length which is less than the axial thickness of the hub. Due to the axial length of the ribs, space is provided adjacent each end thereof on the I.D. of the hub to receive two sets of bearings. The ribs are disposed between the bearing sets and act as a limit stop for the bearing sets.

In a preferred embodiment of the present invention, the hub is cast with a recess in line with each rib on each side face of the hub. The structural interrelationship of the components of the hub constructed in accordance with the present invention enables all bearing retaining surfaces and the I.D. of the hub to be broached with proper concentricity in one step. That is, all required machining is attained in a single pass of a broaching tool. Thus, the present invention provides for use of less metal, provides a wheel which is lighter in weight, requires less machinery, less material handling, and the machining can be done in a shorter period of time since fewer steps are required. In addition, a wheel constructed in accordance with the present invention offers the additional advantage of easy non-destructive removal of a bearing.

It is an object of the present invention to provide a novel wheel.

It is another object of the present invention to provide a wheel wherein two axle bearing sets are spaced from one another by a plurality of radially inwardly directed ribs.

It is another object of the present invention to provide a wheel having a hub structurally interrelated in a manner which decreases the weight thereof, simplifies machining, and which requires less machinery to finish the bearing surfaces thereon.

It is another object of the present invention to provide a wheel structurally interrelated in a manner which facilitates easy non-destructive removal of bearings.

Other objects will appear hereinafter.

For the purpose of illustrating the invention there is shown in the drawings a form which is presently preferred; it being understood, however, that this invention is not limited to the precise arrangements and instrumentalities shown.

Figure 1:
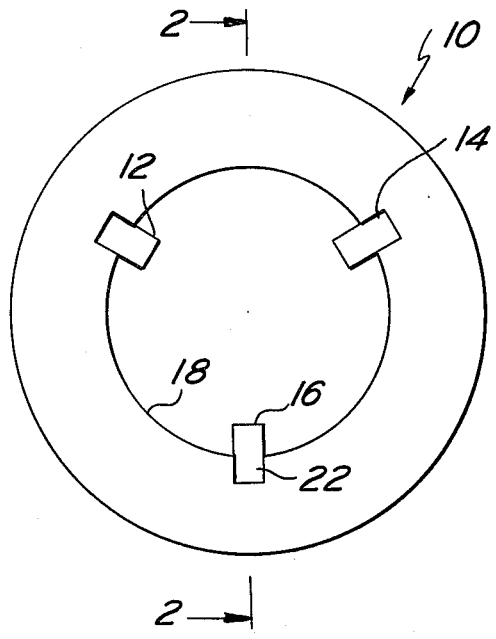
FIG. 1 is a plan view of a hub.
Figure 2:
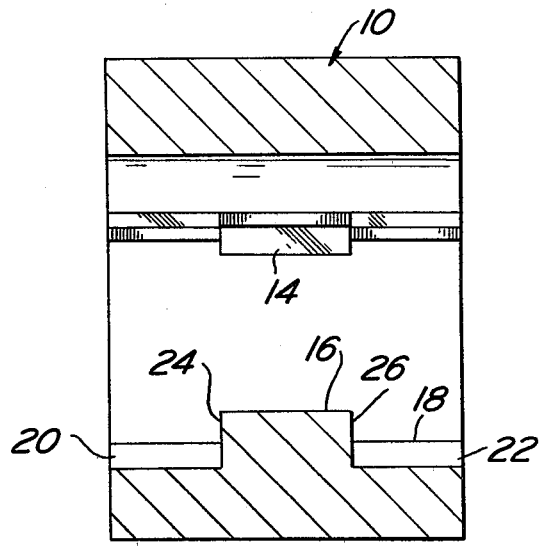
FIG. 2 is a sectional view taken along the line 2—2 in FIG. 1.

Referring to the drawing in detail, wherein like numerals indicate like elements, there is shown in FIGS. 1 and 2 a hub designated generally as 10.

The hub 10 is preferably cast into the annular shape as shown. Hub 10 is preferably die cast from a lightweight non-corrosive material such as aluminum. However, other metals or materials may be utilized in addition to any other known type of production techniques for producing an annular hub.

The hub 10 is cast with a plurality of radially inwardly directed ribs. As shown, hub 10 has ribs 12, 14 and 16. A greater or lesser number of ribs may be provided so long as there are at least two such ribs. The three ribs 12, 14 and 16 are equiangularly disposed, and each lies along a radius.

The hub 10 is also preferably cast with a recess on the inner peripheral surface or I.D. 18 in line with each end of each rib. Since the ribs are identical, only the details of rib 16 will be described. Thus, the casting 10 is provided with recesses 20 and 22 extending from the end faces 24 and 26 of the rib 16 to the side faces of the casting 10. The recesses 20 and 22 have a width corresponding to the width of or wider than the ribs 16. The depth of the recesses in a radial direction may be varied as desired.

The hub 10 having the structure shown in FIGS. 1 and 2 may be machined in a single pass by a broach which renders the I.D. 18 as if it consisted of two surfaces separated by ribs 12, 14 and 16 concentric and true while at the same time the broach may finish the surfaces exposed on the ribs. It is possible to have a completely finished I.D. 18 with a single pass of a broach due to the presence of the recesses aligned with each of the ribs 12, 14 and 16. If the recesses were not present, the corresponding area on the I.D. 18 would require a further machining step in order to provide a true concentric machined bearing surface.

Bearing sets 28 and 34 are provided for the hub 10. The bearing sets may be identical. Bearing set 28 includes an outer race 30 and an inner race 32 having ball bearings therebetween. If desired, bearing sets having roller bearings could be utilized. The outer race 30 engages the end face 24 of the ribs 16 and the corresponding end face of the ribs which act as a limit stop for the bearing set 28. Similarly, the outer race 36 on the bearing set 34 engages the end face 26 on ribs 16 as well as the corresponding end faces on the other ribs. Thus, the ribs 12, 14 and 16 are disposed between and act as limit stops for the bearing sets 28 and 34.

Figure 3:
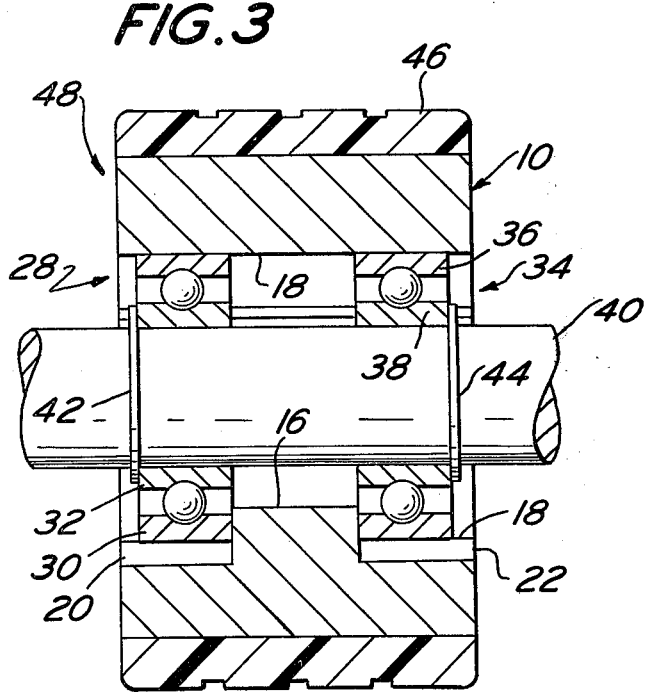
FIG. 3 is a sectional view of a wheel in accordance with the present invention with the hub as shown in FIG. 2 but on an enlarged scale.

The outer races 30 and 36 may be force-fit into the I.D. 18. The inner races 32 and 38 may be retained on the shaft 40 by means of split snap rings 42 and 44 which fit into grooves on the outer peripheral surface of the shaft 40. Shaft 40 acts as an axle for the wheel 48 shown in FIG. 3. If desired, the outer periphery of the hub 10 may be provided with a tire 46. Tire 46 may be any material attached to the outer periphery of the hub 10. A preferred material is a polymer plastic material such as Urethane. The periphery of the tire 46 may be provided with treads of conventional design.

If desired, the bearing sets 28 and 30 may be retained in place by the snap rings 42, 44. Further, the inner race 32 may be force-fit onto the axle or shaft 40.

A wheel 48 constructed as disclosed herein has utility in a wide vareity of vehicles and devices. A preferred use for the wheel 48 is in connection with a vehicle such as that shown in U.S. Pat. No. 3,356,040 wherein wheel 2 would correspond to wheel 48 disclosed herein.

When the shaft or axle 40 is removed, the bearing sets 28 and 34 may be removed in a non-destructive manner. Thus, a tool may be inserted through bearing set 28 into contact with a side face of the race 36 on bearing set 34 in the space between adjacent ribs to push out said bearing set 34. It would not be possible to do this on a conventional wheel wherein the center rib extends for 360°.

The use of two sets of bearings provides better stability and guidance for shaft or axle 40. Such is particularly true where shaft or axle 40 extends to opposite sides of the wheel 48. In some devices where the shaft or axle 40 only extends to one side of the wheel, only one bearing set is needed.

The present invention may be embodied in other specific forms without departing from the spirit or essential attributes thereof and, accordingly, reference should be made to the appended claims, rather than to the foregoing specification as indicating the scope of the invention.

I claim:

1. A wheel comprising an annular hub having a plurality of radially inwardly projecting ribs, the axial length of said ribs being less than the axial thickness of said hub, two sets of bearings in said hub, each rib being between said bearing sets, each rib being a limit stop for said bearing sets, the I.D. of said hub being provided with a recess aligned with each end of each rib, and each recess extending to the side face of the hub.

2. A wheel in accordance with claim 1 including means for maintaining the bearing sets in position adjacent the opposite end faces of said ribs, said plurality of ribs including three equi-angularly spaced ribs lying along a radius of the hub, a tire on the outer periphery of said hub, and the O.D. of said bearing sets being juxtaposed to each recess.

3. A wheel in accordance with claim 1 including a shaft extending through said bearing sets, means for retaining the bearing sets in position, and a tire on the outer periphery of said hub.

4. A wheel in accordance with claim 1 wherein there are three such ribs equi-angularly spaced and lying along a radius of the hub.

5. A method of making a wheel including the steps of providing an annular hub having a plurality of radially inwardly projecting ribs of an axial length less than the axial thickness of the hub, providing recesses on the I.D. of the hub in line with reach rib and extending from an end face of each rib to a side face of the hub, broaching the I.D. of the hub as well as faces of the ribs in a single pass, and inserting two sets of bearings in said hub with the ribs being disposed between said bearing sets.

6. A method in accordance with claim 5 wherein said step of providing an annular hub and providing recesses on the I.D. of the hub includes casting a hub with said recesses and ribs in a manner so that the recesses have a width at least equal to the width of their associated ribs.

7. A wheel comprising an annular hub having a plurality of radially inwardly projecting ribs, the axial length of said ribs being less than the axial thickness of the hub, a discrete recess on the I.D. of the hub aligned with each rib and extending from an end face of the rib to a major face of the hub, each recess being approximately the same width in a circumferential direction as its associated rib, a set of bearings in said hub, the periphery of the bearings overlying each recess, and a side face of the bearings engaging a side face of each rib, and a shaft extending through the bearings.

* * * * *